United States Patent
Yasuda et al.

(10) Patent No.: US 8,789,556 B2
(45) Date of Patent: Jul. 29, 2014

(54) FLOW RATE CONTROL DEVICE, DIAGNOSTIC DEVICE FOR USE IN FLOW RATE MEASURING MECHANISM OR FOR USE IN FLOW RATE CONTROL DEVICE INCLUDING THE FLOW RATE MEASURING MECHANISM AND RECORDING MEDIUM HAVING DIAGNOSTIC PROGRAM RECORDED THEREON FOR USE IN THE SAME

(71) Applicant: Horiba STEC, Co., Ltd., Kyoto (JP)

(72) Inventors: Tadahiro Yasuda, Kyoto (JP); Shigeyuki Hayashi, Kyoto (JP); Akito Takahashi, Kyoto (JP); Tetsuo Shimizu, Kyoto (JP)

(73) Assignee: Horiba STEC, Co., Ltd., Kyoto (JP)

( * ) Notice: Subject to any disclaimer, the term of this patent is extended or adjusted under 35 U.S.C. 154(b) by 159 days.

(21) Appl. No.: 13/651,089

(22) Filed: Oct. 12, 2012

(65) Prior Publication Data

US 2013/0092257 A1 Apr. 18, 2013

(30) Foreign Application Priority Data

Oct. 14, 2011 (JP) ................................ 2011-227399

(51) Int. Cl.
| | | |
|---|---|---|
| *F16K 31/02* | (2006.01) | |
| *G05D 7/06* | (2006.01) | |
| *G01F 1/34* | (2006.01) | |
| *G01F 1/684* | (2006.01) | |
| *G01F 25/00* | (2006.01) | |

(52) U.S. Cl.
CPC .. *G01F 1/34* (2013.01); *G05D 7/06* (2013.01); *G01F 1/6842* (2013.01); *G01F 25/0053* (2013.01)

USPC .......... 137/487.5; 137/486; 73/1.34; 73/1.35; 702/113; 118/715

(58) Field of Classification Search
USPC ........ 137/487.5, 486; 73/1.34, 1.35; 702/113; 118/175
See application file for complete search history.

(56) References Cited

U.S. PATENT DOCUMENTS

| | | | | |
|---|---|---|---|---|
| 4,419,898 A | * | 12/1983 | Zanker et al. | ............... 73/861.02 |
| 5,394,755 A | * | 3/1995 | Sudo et al. | ..................... 73/861 |
| 5,911,238 A | * | 6/1999 | Bump et al. | ............... 137/487.5 |
| 6,205,409 B1 | * | 3/2001 | Zvonar | .......................... 702/183 |
| 6,561,207 B2 | * | 5/2003 | Lowery et al. | ..................... 137/1 |
| 6,799,603 B1 | * | 10/2004 | Moore | .......................... 137/597 |
| 7,174,263 B2 | * | 2/2007 | Shajii et al. | .................. 702/100 |

(Continued)

FOREIGN PATENT DOCUMENTS

JP      2000259255 A     9/2000

*Primary Examiner* — Eric Keasel
*Assistant Examiner* — Minh Le
(74) *Attorney, Agent, or Firm* — Alleman Hall McCoy Russell & Tuttle LLP

(57) ABSTRACT

The flow rate control device is provided with: a fluid resistor provided on the flow channel; a pressure sensor provided in any one of an upstream side or a downstream side of the fluid resistor; a pressure calculating part configured to calculate a pressure in a side with respect to the fluid resistor where the pressure sensor is not provided; a flow rate calculating part configured to calculate a flow rate based on the measurement pressure value and a calculation pressure value calculated by the pressure calculating part; and an abnormality diagnosing part configured to diagnose an abnormality of the measurement flow rate value based on the measurement flow rate value and a calculation flow rate value.

9 Claims, 5 Drawing Sheets

(56) References Cited

U.S. PATENT DOCUMENTS

| | | | |
|---|---|---|---|
| 7,335,396 B2* | 2/2008 | Carpenter et al. | 427/248.1 |
| 7,412,986 B2* | 8/2008 | Tison et al. | 137/12 |
| 7,424,895 B2* | 9/2008 | Tison et al. | 137/12 |
| 7,463,991 B2* | 12/2008 | Shajii et al. | 702/100 |
| 7,658,204 B2* | 2/2010 | Ishida | 137/486 |
| 7,835,874 B2* | 11/2010 | Wong et al. | 702/50 |
| 7,881,886 B1* | 2/2011 | Shareef et al. | 702/47 |
| 7,975,558 B2* | 7/2011 | Lee et al. | 73/861.08 |
| 7,979,165 B2* | 7/2011 | Gotoh et al. | 700/282 |
| 8,205,629 B2* | 6/2012 | Gregor et al. | 137/2 |
| 8,443,649 B2* | 5/2013 | Yasuda et al. | 73/1.34 |
| 2004/0261492 A1* | 12/2004 | Zarkar et al. | 73/1.34 |
| 2006/0218762 A1* | 10/2006 | Sandhu et al. | 29/25.01 |
| 2006/0260691 A1* | 11/2006 | Davidoff | 137/487.5 |
| 2008/0140260 A1* | 6/2008 | Ding | 700/282 |
| 2008/0223455 A1* | 9/2008 | Fukuhara et al. | 137/488 |
| 2009/0019943 A1* | 1/2009 | Ozawa et al. | 73/861 |
| 2009/0183549 A1* | 7/2009 | Monkowski et al. | 73/1.35 |
| 2009/0326719 A1* | 12/2009 | Nagase et al. | 700/282 |
| 2010/0145633 A1* | 6/2010 | Yasuda | 702/45 |
| 2010/0163119 A1* | 7/2010 | Isobe et al. | 137/486 |
| 2010/0236643 A1* | 9/2010 | Brodeur et al. | 137/487.5 |
| 2011/0029268 A1* | 2/2011 | Shareef et al. | 702/100 |
| 2013/0186486 A1* | 7/2013 | Ding | 137/487 |

\* cited by examiner

FLOW RATE CONTROL DEVICE, DIAGNOSTIC DEVICE FOR USE IN FLOW RATE MEASURING MECHANISM OR FOR USE IN FLOW RATE CONTROL DEVICE INCLUDING THE FLOW RATE MEASURING MECHANISM AND RECORDING MEDIUM HAVING DIAGNOSTIC PROGRAM RECORDED THEREON FOR USE IN THE SAME

TECHNICAL FIELD

The present invention relates to a flow rate control device and the like having a configuration for diagnosing an abnormality of a measurement flow rate value indicated by a flow rate measuring mechanism for measuring a flow rate of fluid flowing through a flow channel.

BACKGROUND ART

For example, in manufacturing semiconductor products and the like, it is necessary that a process gas containing raw materials required for deposition is accurately supplied at a target flow rate with high accuracy while a wafer is placed in a chamber of, for example, a chemical vapor deposition (CVD) device.

For controlling a flow rate of, for example, a process gas, a mass flow controller is provided on a flow channel connected to the chamber. A flow channel is formed in this mass flow controller, and the mass flow controller is configured as one package composed of a block body provided with various kinds of flow rate control equipment attached thereto, a flow rate measuring mechanism such as a thermal type flow rate sensor for measuring a flow rate of fluid flowing through the flow channel, a flow rate control valve, and a valve control part for controlling an opening degree of the flow rate control valve so as to reduce an error between a target flow rate value and a measurement flow rate value measured by the flow rate measuring mechanism.

Furthermore, some of the products of the process gas can easily adhere to an inside of a fine sensor flow channel for measuring a flow rate, such as a laminar element for diverting the fluid, and if the products adhere, clogging may occur so that an accurate flow rate cannot be measured in some cases. If a flow rate measurement value measured by the flow rate measuring mechanism is inaccurate, an error may be likely caused in an actual flow rate of the process gas flowing into the chamber even if the flow rate control valve is accurately controlled. Accordingly, it becomes impossible to manufacture a semiconductor having a desired performance.

In order to solve such problems, a flow rate control device, such as a mass flow controller having a configuration for diagnosing, e.g., whether or not such a clogging occurs in a flow rate measuring mechanism that causes an abnormality in a measurement flow rate value, has been conventionally proposed.

For example, a flow rate control device described in Patent Literature 1 is configured to control a process gas at a target flow rate by using a sonic nozzle, wherein a ratio of an upstream side pressure and a downstream side pressure of an orifice is made to be equal to or larger than a predetermined value so that a fluid flow maintains a sonic velocity, and the flow rate control device is provided with a pressure control valve for controlling only a pressure in the upstream side of the orifice in accordance with a target flow rate value. In this configuration, if products of the process gas adhere and the like so that the orifice is clogged or an effective sectional area thereof is changed, it becomes impossible to introduce a process gas at a desired flow rate value. Therefore, a diagnostic circuit is provided for diagnosing an abnormality caused by a clogging of the orifice. This diagnostic circuit compares a first flow rate measurement value outputted from a flow rate measuring mechanism to a second measurement flow rate value measured by a thermal type flow rate sensor, wherein the flow rate measuring mechanism includes a pressure sensor provided in the upstream of the orifice, a temperature sensor similarly provided in the upstream of the orifice, a calculating part for calculating a flow rate of the fluid flowing in the upstream of the orifice using the Bernoulli Expression and by substituting therein a measurement pressure measured by the pressure sensor and a measurement temperature measured by the temperature sensor. Subsequently, if an error between the first flow rate measurement value and the second flow rate measurement value is equal to or larger than an acceptable amount, a signal is outputted indicating a suggestion that the orifice be exchanged. Herein, the first flow rate measurement value obtained by the flow rate measuring mechanism is fed back and used for controlling an opening degree of the pressure control valve.

In other words, in the flow rate control device disclosed in Patent Literature 1, in order to diagnose a clogging in the orifice, the diagnostic circuit is configured to be operative by providing a thermal type flow rate sensor which is not used for feedback control, other than the flow rate measuring mechanism for feedback control.

However, a demand for reducing costs is severe in the field of semiconductor manufacturing. As such, even in the case of a flow rate control device as described above, it is required that clogging of a flow channel and an abnormality of a measurement flow rate value can be accurately diagnosed so as to be able to control flow rate with high accuracy while reducing the number of parts as much as possible.

From this point of view, the flow rate control device of Patent Literature 1, wherein in order to diagnose a clogging, it is necessary that a total of four sensors, i.e., a pressure sensor, a temperature sensor and further two temperature sensors for constituting a thermal type flow rate sensor provided upstream of the orifice, be provided on the flow channel, cannot satisfy the demand for reduction in cost and number of parts. On the other hand, if the number of the sensors is simply reduced, it becomes difficult using the above configuration, to precisely diagnose, based on a quantitative evaluation, whether or not the measurement flow rate value used in the feedback control indicates a correct value to an acceptable degree, or to accurately diagnose whether or not clogging actually occurs in the flow channel.

CITATION LIST

Patent Literature

Patent Literature 1: JP2000-259255A

SUMMARY OF THE INVENTION

Technical Problem

The present invention has been made in consideration of the problems as described above, and an object thereof is to provide a flow rate control device, a diagnostic device for use in a flow rate measuring mechanism or for use in the flow rate control device which includes the flow rate measuring mechanism and a recording medium having a diagnostic program recorded thereon for use in the same, capable of accurately diagnosing a malfunction such as a clogging caused in a flow rate device and an abnormality occurring in a measurement flow rate value while reducing the number of parts such as sensors used in the flow rate control device.

Solution to Problem

That is, the flow rate control device of the present invention includes a flow rate measuring mechanism configured to measure a flow rate of fluid flowing through a flow channel, a flow rate control valve provided on the flow channel, and a valve control part for controlling an opening degree of the flow rate control valve so as to reduce an error between a target flow rate value and a measurement flow rate value measured by the flow rate measuring mechanism, wherein the flow rate control device includes: a fluid resistor provided on the flow channel; a pressure sensor provided in any one of an upstream side or a downstream side of the fluid resistor; a pressure calculating part configured to calculate a pressure in a side with respect to the fluid resistor where the pressure sensor is not provided based on a measurement flow rate value measured by the flow rate measuring mechanism and a measurement pressure value measured by the pressure sensor; a flow rate calculating part configured to calculate a flow rate of the fluid flowing through the flow channel based on the measurement pressure value and a calculation pressure value calculated by the pressure calculating part; and an abnormality diagnosing part configured to diagnose an abnormality of the measurement flow rate value based on the measurement flow rate value and a calculation flow rate value calculated by the flow rate calculating part.

In addition, the diagnostic device of the present invention is used in a flow rate measuring mechanism configured to measure a flow rate of fluid flowing through a flow channel, or is used in a flow rate control device including the flow rate measuring mechanism, wherein the diagnostic device includes: a fluid resistor provided on the flow channel; a pressure sensor provided in any one of an upstream side or a downstream side of the fluid resistor; a pressure calculating part configured to calculate a pressure in a side where the pressure sensor is not provided with respect to the fluid resistor based on a measurement flow rate value measured by the flow rate measuring mechanism and a measurement pressure value measured by the pressure sensor; a flow rate calculating part configured to calculate a flow rate of the fluid flowing through the flow channel based on the measurement pressure value and a calculation pressure value calculated by the pressure calculating part; and an abnormality diagnosing part configured to diagnose an abnormality of the measurement flow rate value based on the measurement flow rate value and a calculation flow rate value calculated by the flow rate calculating part.

With the configuration like this, only one pressure sensor is provided in any one of the upstream side or downstream side of the fluid resistor other than the flow rate measuring mechanism configured to measure a measurement flow rate value to be used for controlling the flow rate control valve, and therefore the number of sensors to be added to the flow rate control device for purposes other than for feedback control can be reduced as compared to the conventional configuration so that an increase in manufacturing cost can be suppressed.

Moreover, the calculation flow rate value to be used for comparison with the measurement flow rate value by the abnormality diagnosing part cannot be inherently calculated with accuracy if pressure values both in the upstream side and the downstream side of the fluid resistor are not known. On the other hand, in the present invention, the pressure calculating part and the flow rate calculating part are cooperative so that the calculation flow rate value, substantially equal to a flow rate of fluid actually flowing through the flow channel, can be calculated.

Therefore, since the calculation flow rate value to be compared to the measurement flow rate value is calculated as a value approximate to an actual flow rate while reducing inherently required sensors, the abnormality diagnosing part can also accurately diagnose an abnormality by comparing these flow rate values. Furthermore, since a flow rate value to be compared is a reliable calculation flow rate value, it is possible to quantitatively evaluate, for example, the degree of an error between the measurement flow rate value and an actual flow rate. That is, the abnormality diagnosing part can, not only make a qualitative determination of whether or not an abnormality occurs in the measurement flow rate value, but also a quantitative determination as to whether or not an abnormality occurring in the measurement flow rate value is within an acceptable.

In order to suppress inclusion of an error in each measurement value so as to be able to reduce an error between a calculation pressure value to be calculated and an actual pressure value, the flow rate control device may further include a stable state judging part configured to judge whether or not a state of the fluid flowing through the flow channel is in a stable state, based on the measurement flow rate value or a measurement pressure value measured by the pressure sensor, wherein the pressure calculating part is configured to calculate the pressure in the side where the pressure sensor is not provided with respect to the fluid resistor in the case where the stable state judging part judges the state of the fluid to be in a stable state. With this configuration, since the flow rate calculating part calculates the calculation flow rate value based on a calculation pressure value accurately estimated while the fluid is judged to be stable by the stable state judging part and a measurement pressure value actually measured, an error of the calculation flow rate value with respect to the flow rate actually flowing through the flow channel can also be naturally reduced.

In order to be able to properly judge a stable state of the fluid and increase estimated accuracy of the calculation pressure value so as to make the estimated accuracy of the calculation flow rate value reliable, the stable state judging part may be configured so as to judge that the state of the fluid is in a stable state in the case where a state of an absolute value of the error between the measurement flow rate value and the target flow rate value being equal to or smaller than a predetermined value continues for a predetermined time period or more.

In order that the flow rate control device can be kept in use in the case where an error is acceptable according to an object of the usage even if an error occurs in the measurement flow rate value while diagnosing that there is an abnormality in the case where an error exceeds an acceptable limit, so that, for example, a number of maintenances can be reduced as much as possible, the abnormality diagnosing part may be configured to diagnose that there is an abnormality in the measurement flow rate value in the case where an absolute value of an error between the measurement flow rate value and the calculation flow rate value becomes equal to or larger than a predetermined value.

In order able to judge when the fluid attains a stable state such as whether or not an apparent abnormality occurs in the measurement flow rate value, the flow rate calculating part may be configured to calculate the calculation flow rate value based on the measurement pressure value and a predetermined specified pressure value until the stable state judging part judges the state of the fluid to be in a stable state. With this configuration, if there occurs a large abnormality, it becomes possible to detect the abnormality even, for example, immediately after a flow rate control is started by the flow rate control device.

As a concrete example of the flow rate measuring mechanism that can easily detect an abnormality in diagnosis by the abnormality diagnosing part, the flow rate measuring mechanism may be configured as a thermal type flow rate sensor.

In order to make it easy to diagnose an abnormality caused by clogging due to, for example, adhesion of substances contained in the fluid, the thermal type flow rate sensor may be configured to include a laminar flow element provided on the flow channel, and the fluid resistor may be provided separately from the laminar flow element. Specifically, since the fluid resistor is provided independently of the flow rate measuring mechanism, the calculated flow rate value can be less affected by the clogging occurring in the flow rate measuring mechanism. In other words, by providing the fluid resistor independently from the flow rate measuring mechanism, as compared to the case of utilizing a common laminar flow element and fluid resistor, the errors associated in both of the measurement flow rate value and the calculated flow rate value can be distinguished so as to prevent a situation where the determination of the abnormality becomes difficult.

As a further example, in order to make it possible to configure the diagnostic device of the present invention to be appended to an existing flow rate control device, a diagnostic program of the present invention may be installed from, for example, a recording medium such as a computer. Specifically, the diagnostic program of the present invention is a diagnostic program for use in a flow rate control device including the flow rate measuring mechanism or a flow rate measuring mechanism including a fluid resistor provided on a flow channel and a pressure sensor provided in any of an upstream side or a downstream side of the fluid resistor, and for measuring a flow rate of the fluid flowing through the flow channel, the diagnostic program comprising: a pressure calculating part configured to calculate a pressure in a side with respect to the fluid resistor where the pressure sensor is not provided based on a measurement flow rate value measured by the flow rate measuring mechanism and a measurement pressure value measured by the pressure sensor; a flow rate calculating part configured to calculate a flow rate of the fluid flowing through the flow channel based on the measurement pressure value and a calculation pressure value calculated by the pressure calculating part; and an abnormality diagnosing part configured to diagnose an abnormality of the measurement flow rate value based on the measurement flow rate value and a calculation flow rate value calculated by the flow rate calculating part.

Advantageous Effects of the Invention

Thus, according to the flow rate control device, in a diagnostic device for use in the flow rate measuring mechanism, or for use in the flow rate control device which includes the flow rate measuring mechanism and recording medium having a diagnostic program recorded thereon for use in the same of the present invention, as a configuration for diagnosing an abnormality, it is sufficient to provide only one sensor other than the flow rate measuring mechanism for outputting the measurement flow rate value to be used in the feedback control. Hence, the number of parts can be reduced so as to suppress the increase of the manufacturing cost. In addition, since the calculation flow rate value can be accurately calculated by calculating the calculation pressure value and calculation flow rate value based on the measurement flow rate value when the fluid is in a stable state and the measurement pressure value, it becomes possible to diagnose an abnormality of the measurement flow rate value with an accuracy equal to or higher than that in a conventional configuration, even in the case where the number of the diagnostic sensors is smaller than that in the conventional configuration.

DESCRIPTION OF REFERENCE CHARACTERS

Figure 1:
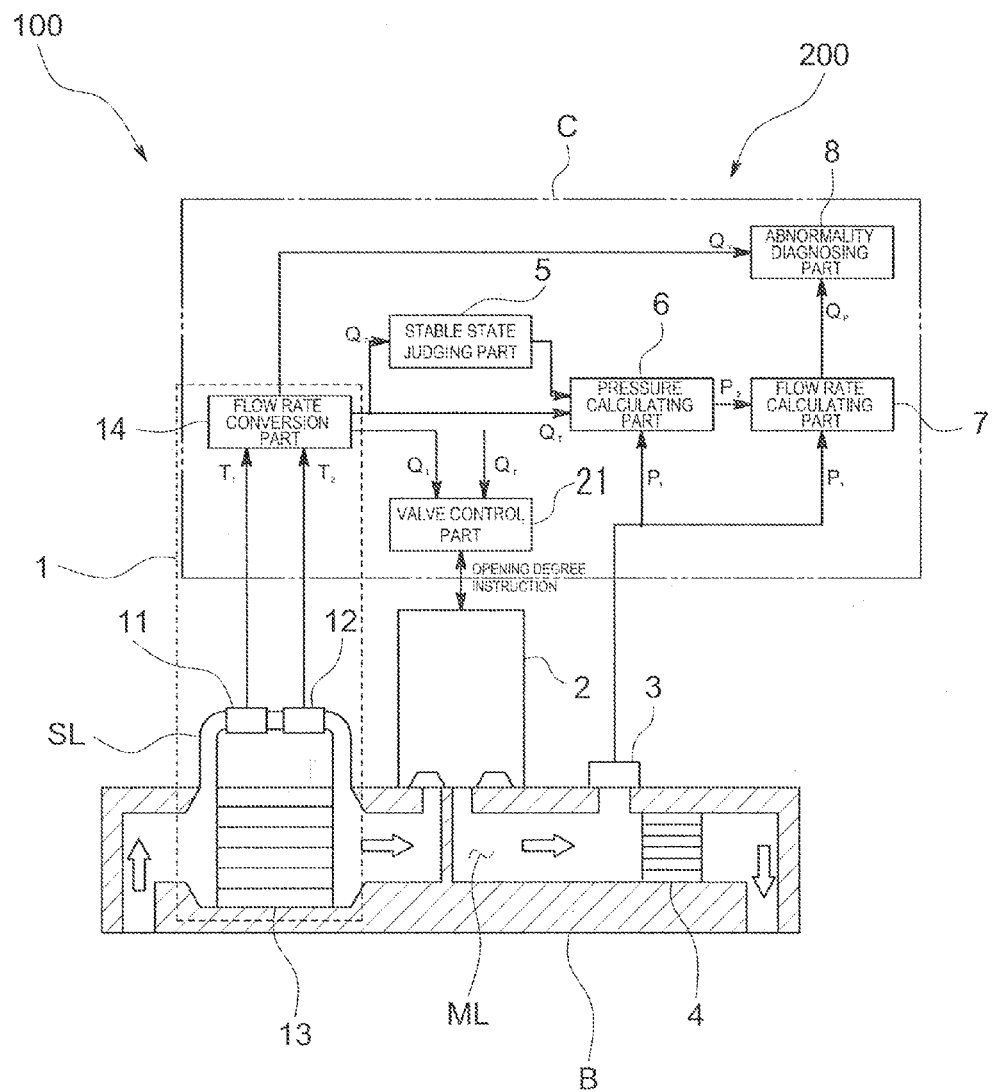
FIG. 1 is a schematic diagram showing a mass flow controller and a diagnostic device in a first embodiment.

100 . . . Mass flow controller (flow rate control device)
200 . . . Diagnostic device
1 . . . Thermal type flow rate sensor (flow rate measuring mechanism)
13 . . . Laminar flow element
2 . . . Flow rate control valve
21 . . . Valve control part
3 . . . Pressure sensor
4 . . . Fluid resistor
5 . . . Stable state judging part
6 . . . Pressure calculating part
7 . . . Flow rate calculating part
8 . . . Abnormality diagnosing part

DESCRIPTION OF THE EMBODIMENTS

The following describes a flow rate control device and a diagnostic device 200 according to a first embodiment of the present invention, referring to the accompanying drawings.

The flow rate control device of the first embodiment is configured by a mass flow controller 100 which is used for supplying a process gas containing raw materials required for deposition in a chamber such as a chemical vapor deposition (CVD) device, for example, in semiconductor manufacture. As shown in the schematic view of FIG. 1, the mass flow controller 100 is configured to have a block body B of a substantially rectangular parallelepiped shape in which a through path is formed to form a flow channel ML for fluid to flow, wherein equipment for controlling fluid and various kinds of equipment for constituting the diagnostic device 200 are attached to an upper surface of the block body B so that the mass flow controller 100 is packaged.

More specifically, the mass flow controller 100 includes a flow rate measuring mechanism, a flow rate control valve 2, a pressure sensor 3 and a fluid resistor 4 which are provided on or in the flow channel ML formed inside the block body B in this order from the upstream side, and further includes a calculating part C for performing various calculations for controlling and diagnosing each equipment. And, the mass flow controller 100 controls an opening degree of the flow rate control valve 2 so as to reduce an error between a target flow rate value $Q_r$ and a measurement flow rate value $Q_T$ measured by the flow rate measuring mechanism to thereby supply a desired flow rate into the chamber.

Each part is described referring to FIG. 1. First, a hardware configuration is mainly described.

As shown in FIG. 1, the block body B includes a fluid introduction port for introducing the fluid into the inside flow channel ML and a fluid derivation port for deriving the fluid of which the flow rate is controlled, wherein the fluid introduction port and the fluid derivation port are opening in a lower surface of the block body B. In an upper surface thereof, attachment holes are formed for attaching the flow rate measuring mechanism, flow rate control valve 2 and pressure sensor 3, and for communicating with the flow channel ML.

The flow rate measuring mechanism is configured to measure a flow rate of fluid flowing inside the block body B, and a thermal type flow rate sensor 1 is used for the flow rate measuring mechanism in the first embodiment. This thermal type flow rate sensor 1 includes: a laminar flow element 13 provided in the flow channel ML; a sensor flow channel SL which is a metal fine tube formed to have a substantially inverted U-character shape and which branches from the flow channel ML upstream of the laminar flow element 13 and joins to the flow channel ML downstream of the laminar flow element 13; a first temperature sensor 11 and a second temperature sensor 12 respectively provided in the upstream side and downstream side on the outside of the metal fine tube forming the sensor flow channel SL; and a flow rate conversion part 14 converting a flow rate flowing through the flow channel ML based on a temperature difference measured by the first and second temperature sensors 11 and 12. It is noted that the flow rate conversion part 14 is constructed using a calculating function of the calculating part C, to be described later so that the measurement flow rate value $Q_T$ is calculated based on the following Expression 1.

$$Q_T = k_T(T_1 - T_2) \quad \text{Expression (1)}$$

Herein, $Q_T$ is a measurement flow rate value, $k_T$ is a conversion factor from a temperature difference to a flow rate, $T_1$ is an upstream side temperature measured by the first temperature sensor 11, and $T_2$ is a downstream side temperature measured by the second temperature sensor 12.

The laminar flow element 13 is configured to divert the fluid from the flow channel ML to the sensor flow channel SL at a predetermined diverting ratio, and it is formed by, for example, laminating thin plates in which minute through grooves are formed. That is, a length and a depth of each of the through grooves are set so that the fluid flows in a laminar flow state when passing through the laminar flow element 13. Since the laminar flow element 13 has such a micro-structure, in some cases, products from the process gas passing through the laminar flow element 13 may attach to the micro-structure of the through grooves and the like and cause clogging. Moreover, since the sensor flow channel SL is also constituted of a metal fine tube, clogging may also occur there as well. And, if clogging occurs in the laminar flow element 13 or the sensor flow channel SL, the diverting ratio is changed, and therefore the temperature difference measured by the first and second temperature sensors 11 and 12 does not reflect an actual flow rate, which results in occurrence of an abnormality in the measurement flow rate value $Q_T$ measured by the thermal type flow rate sensor 1.

The flow rate control valve 2 is, for example, a piezo valve of which an opening degree is controlled by a valve control part 21 to be described later.

The fluid resistor 4 is configured to cause a pressure difference between the upstream side and the downstream side thereof; for example, a fluid resistor having a structure similar to that of the laminar flow element 13 or an orifice may be used.

The pressure sensor 3 is configured to measure a pressure between the flow rate control valve 2 and the fluid resistor 4, in the upstream side of the fluid resistor 4. In a different way of viewing the fluid resistor 4 and the pressure sensor 3, this pressure type flowmeter configuration retains only the pressure sensor 3 in the upstream side, while a pressure sensor in the downstream side is omitted.

Next, a software configuration is mainly described.

The calculating part C is configured in a manner that its function is implemented by, for example, a computer or microcomputer provided with a CPU, memory, I/O interface, A/D and D/A converters and the like, and that functions as at least a valve control part 21, stable state judging part 5, pressure calculating part 6, flow rate calculating part 7 and abnormality diagnosing part 8, and is executed by carrying out a program stored in the memory. It is noted that, in the first embodiment, the diagnostic device 200 is composed of the pressure sensor 3, the fluid resistor 4, the stable state judging part 5, the pressure calculating part 6, the flow rate calculating part 7 and the abnormality diagnosing part 8.

Each part is described below.

The valve control part 21 is configured to control an opening degree of the flow rate control valve 2 so as to reduce an error between the measurement flow rate value $Q_T$ calculated by the thermal type flow rate sensor 1 and the target flow rate value $Q_r$. More specifically, if the measurement flow rate value $Q_T$ is fed back, the error with respect to the target flow rate value $Q_r$ is calculated so as to change a voltage to be applied to the flow rate control valve 2 in accordance with the error. It is noted that the target flow rate value $Q_r$ may be an instruction value previously inputted as a program or may be sequentially inputted by an external input. In the first embodiment, as the target flow rate value $Q_r$, a step-like input value is inputted to the valve control part 21 for the purpose of continuing to hold a certain constant value for a predetermined time. For example, a value of a step input is changed every time a state of a process is switched.

Figure 2:
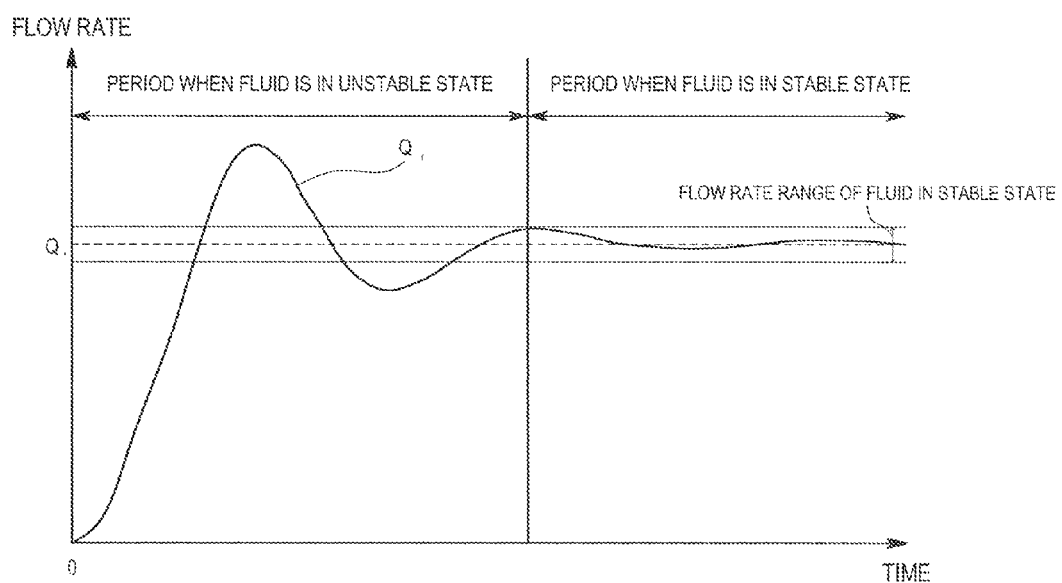
FIG. 2 is a schematic graph for explaining an operation of a stable state judging part of the first embodiment.

The stable state judging part 5 is configured to judge based on the measurement flow rate value $Q_T$ whether or not a state of fluid flowing through the flow channel ML is in a stable state. More specifically, the stable state judging part 5 is configured such that, as shown in the graph of FIG. 2, in the case where a state of an absolute value of the error between the measurement flow rate value $Q_T$ and the target flow rate value $Q_r$ being equal to or smaller than a predetermined value is maintained for a predetermined time or more, the state of the fluid is judged to be in a stable state. Herein, the state of the fluid being in a stable state can also be said to mean a state wherein parameters relating to a flow rate such as a flow rate and a pressure of the fluid flowing through the flow channel ML are not largely varied with time, but are substantially kept constant. Further, in other words, it may be also said that "fluid being stable" means a state in which both or any one of the measurement flow rate value $Q_T$ and the measured pressure value are within a range of a predetermined value and are continuously and substantially kept constant for a predetermined time. It is noted that the predetermined value and the predetermined time may be previously set at a time of factory-shipment, or a user may appropriately set the value.

As shown in FIG. 2, in the case where the stable state judging part 5 judges the fluid to be in a stable state, the pressure calculating part 6 is configured to calculate a pressure in the side (the other side) where the pressure sensor 3 is not provided with respect to the fluid resistor 4 based on the measurement flow rate value $Q_T$ and the measurement pressure value $P_1$. In other words, the pressure calculating part 6 is configured to calculate a pressure in the downstream side of the fluid resistor 4 where the pressure sensor 3 is not provided and an actual measurement of the pressure is not performed, by taking advantage of the fact that the measurement flow rate value $Q_T$ measured by the thermal type flow rate sensor 1 becomes equal to an estimated flow rate value which will be measured in the case where a further pressure sensor 3 is provided in the downstream of the fluid resistor 4 so as to configure a pressure type flowmeter. More specifically, the pressure calculating part 6 is configured to calculate a pressure in the downstream side of the fluid resistor 4 based on Expression 2 as follows.

$$Q_T = k_P(P_1^2 - P_2^2) \quad \text{Expression (2)}$$

Herein, $Q_T$ is a measurement flow rate value measured by the thermal type flow rate sensor 1, $k_P$ is a conversion factor from a pressure judged by the fluid resistor 4 to a flow rate, $P_1$ is a measurement pressure value in the upstream side of the fluid resistor 4 measured by the pressure sensor 3, and $P_2$ is a pressure value in the downstream side of the fluid resistor 4 and is an unknown value. That is, the pressure value in the downstream side is to be calculated from a relationship between the pressure and the flow rate.

Referring to Expression 2, it is derived assuming that the same value of the flow rate of the fluid flowing through the flow channel ML is outputted even in the case of calculating the flow rate using different measuring systems (e.g. a thermal type and pressure type measuring system), wherein the left side of the Expression 2 represents a flow rate value measured by the thermal type measuring system and the right side thereof represents a flow rate value which will be measured by the pressure type measuring system. Since the pressure calculating part 6 estimates a pressure in the downstream side of the fluid resistor 4 based on Expression 2 when the fluid is judged to be in a stable state by the stable state judging part 5, it is possible to satisfy the requirement, which is an assumption of Expression 2, that each of the flow rate values is equal. For example, in the case where there enters a disturbance so that the flow rate values measured by the respective measuring types are different, since the calculation pressure value $P_2$, which is the pressure in the downstream side of the fluid resistor 4, will be never outputted, the pressure can be accurately estimated. Also, the pressure calculating part 6 is configured such that, once the pressure in the downstream side of the fluid resistor is calculated, the calculated calculation pressure value $P_2$ is stored in a calculation pressure value storage part (not shown) formed in memory so that a calculation pressure value $P_2$ is not newly calculated again thereafter, for example, until the stable state of the fluid is lost. Then, in the case where the stable state of the fluid is lost, the pressure value calculating part 6 is configured to perform a calculation of the calculation pressure value again in the case where the fluid is judged to be in a stable state by the stable state judging part 5. Herein, it may be configured to judge, every predetermined time period, whether or not the fluid is stable, and when the fluid is stable, the calculation pressure value calculated by the pressure calculating part 6 may be updated and stored in the calculation pressure value storage part.

The flow rate calculating part 7 is configured to calculate a flow rate of fluid flowing through the flow channel ML based on the measurement pressure value $P_1$ which is a pressure in the upstream side of the fluid resistor 4 measured by the pressure sensor 3 and calculation pressure value $P_2$ which is a pressure in the downstream side of the fluid resistor calculated by the pressure calculating part 6. That is, a calculation flow rate value $Q_P$ calculated by the flow rate calculating part 7 is calculated based on Expression 3 as follows.

$$Q_P = k_P(P_1^2 - P_2^2) \quad \text{Expression (3)}$$

Herein, $Q_P$ is a calculation flow rate value based on a pressure calculated by the flow rate calculating part 7, $k_P$ is a conversion factor from a pressure judged by the fluid resistor 4 to a flow rate, $P_1$ is a measurement pressure value in the upstream side of the fluid resistor 4 measured by the pressure sensor 3, and $P_2$ is a calculation pressure value in the downstream side of the fluid resistor 4 calculated by the pressure calculating part 6 and thereafter stored.

In addition, the flow rate calculating part 7 is configured to calculate the calculation flow rate value $Q_P$ based on a predetermined specified pressure value and Expression 3 until a pressure in the downstream side of the fluid resistor 4 is calculated by the pressure calculating part 6.

Thus, the flow rate calculating part 7 can output a reliable calculation flow rate value $Q_P$ based only on the calculation pressure value $P_2$ accurately calculated by the pressure calculating part 6 and the measurement pressure value $P_1$ currently measured by the pressure sensor 3, independently of the thermal type flow rate sensor 1.

The abnormality diagnosing part 8 is configured to diagnose an abnormality of the corresponding measurement flow rate value $Q_T$ based on the measurement flow rate value $Q_T$ measured by the thermal type flow rate sensor 1 and the calculation flow rate value $Q_P$ calculated by the flow rate calculating part 7. More specifically, this abnormality diagnosing part 8 is configured to diagnose that there is an abnormality in the corresponding measurement flow rate value $Q_T$ the case where an absolute value of an error between the measurement flow rate value $Q_T$ and the calculation flow rate value $Q_P$ is equal to or larger than a predetermined value. Herein, the predetermined value is set based on an acceptable error of a flow rate of fluid whose flow rate is controlled by the mass flow controller 100, and it is set to, for example, a value such as 1% of a target flow rate value $Q_r$. That is, the abnormality diagnosing part 8 accordingly judges not only whether or not an abnormality merely occurs in the measurement flow rate value $Q_T$ but also whether or not an error caused by the abnormality is an acceptable error in the flow rate control. Therefore, the predetermined value can be appropriately changed in accordance with, for example a usage object, so that diagnostic criteria can be adjusted to be suited for a particular usage condition. Moreover, whereas a pressure in the downstream side of the fluid resistor 4 is not actually measured, as described concerning the pressure calculating part 6 and flow rate calculating part 7, the calculation pressure value $P_2$ and the calculation flow rate value $Q_P$ are calculated in a state that the stable state judging part 5 judges the fluid to be in a stable state. Therefore, the calculation pressure value $P_2$ and the calculation flow rate value $Q_P$ are accurately estimated so as to be available as the diagnostic criteria. It is noted that the predetermined value described here may be also appropriately set by a user according to, for example, a particular usage state.

Figure 3:
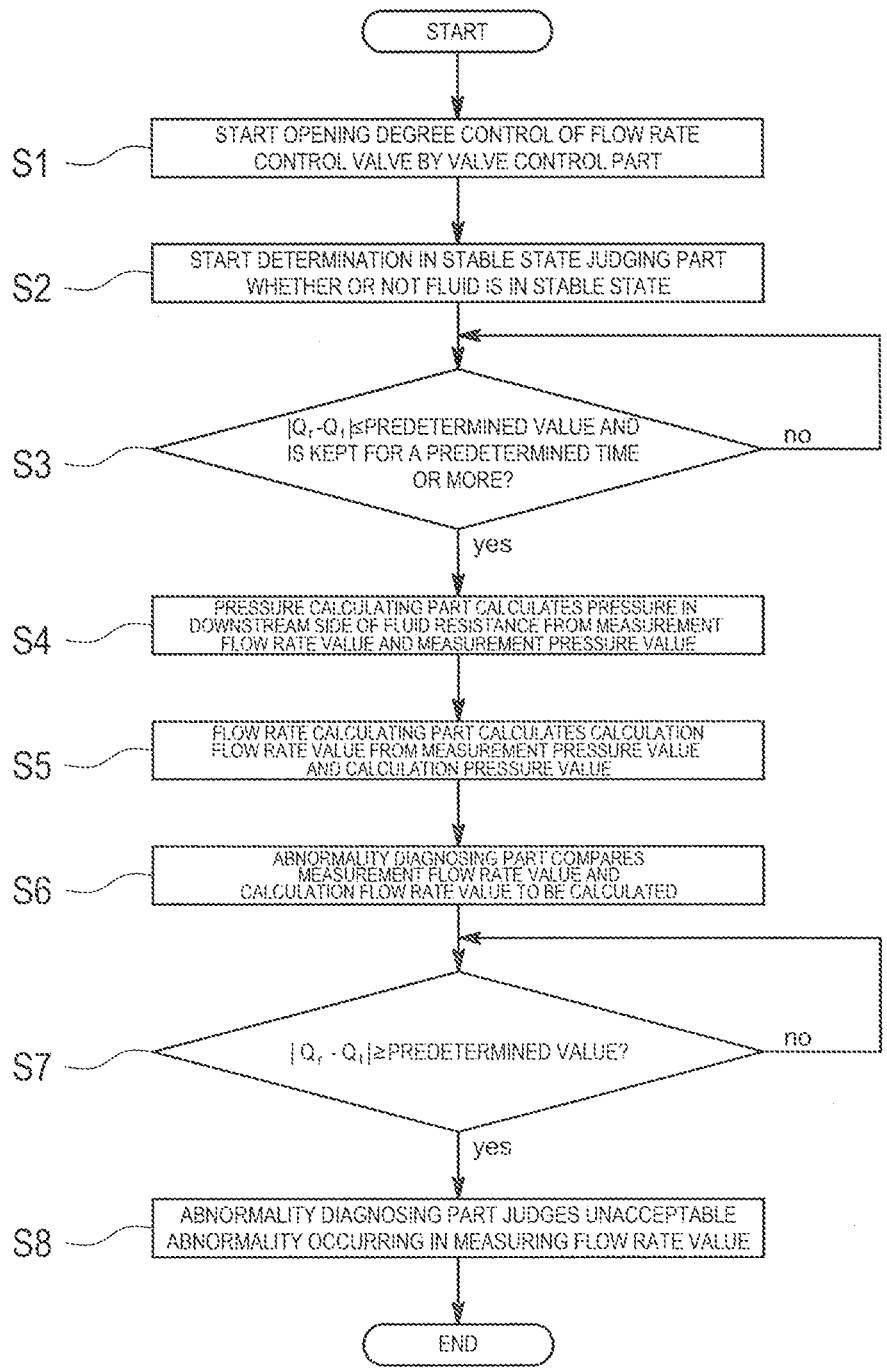
FIG. 3 is a flowchart showing an operation of the mass flow controller and an operation relating to a diagnosis of the diagnostic device of the first embodiment.
Figure 4:
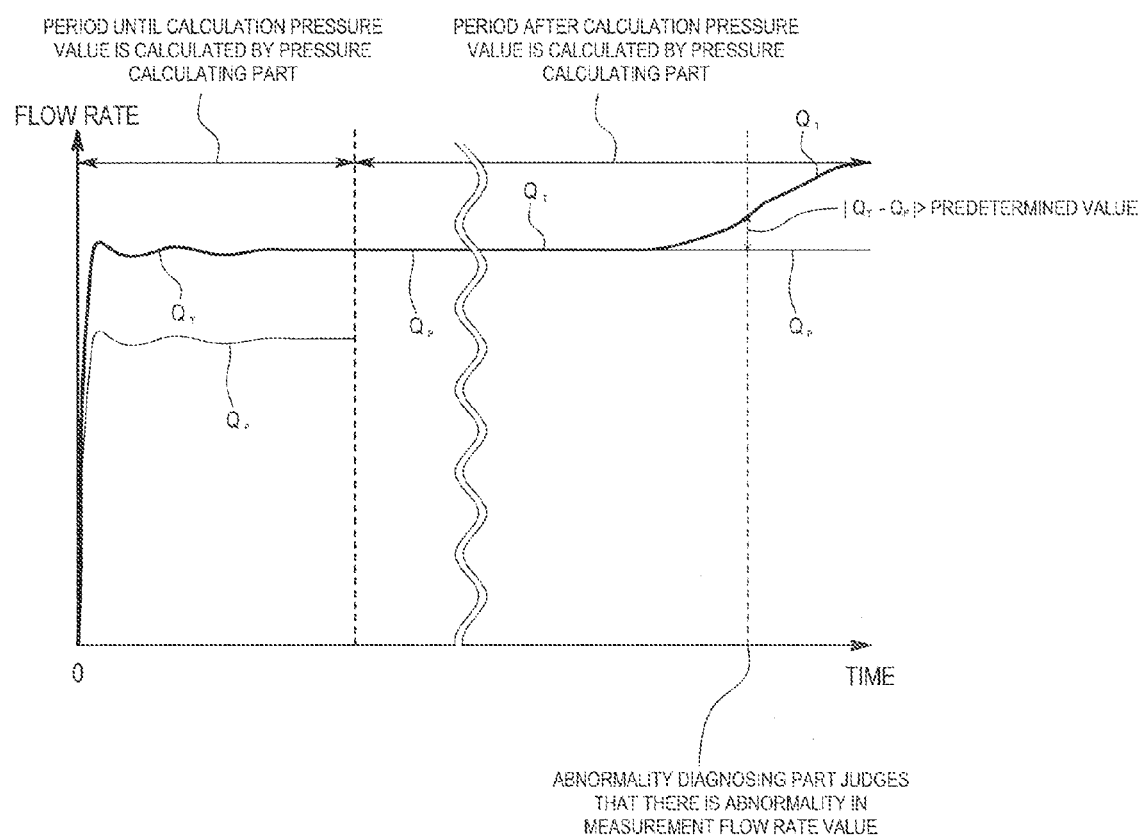
FIG. 4 is a schematic graph explaining changes in measurement flow rate value and calculation flow rate value and an operation relating to a diagnosis in the first embodiment.

An operation concerning a diagnosis of the measurement flow rate value $Q_T$ of the mass flow controller 100 configured as described above will be described referring to the flow chart in FIG. 3 and the graph in FIG. 4.

First, the control of the opening degree of the flow rate control valve 2 is started by the valve control part 21 in a manner that an error between a measurement flow rate value $Q_T$ measured by the thermal type flow rate sensor 1 and a target flow rate value $Q_r$ is reduced (Step S1). When the flow rate control is started, the stable state judging part 5 determines whether or not the fluid is in a stable state (Step S2). In the case where a state of the error between the measurement flow rate value $Q_T$ and the target flow rate value $Q_r$ is equal to or smaller than a predetermined value, and is maintained as such for a predetermined time or longer, the stable state judging part 5 judges the state to be stable (Step S3). The pressure calculating part 6 calculates the calculation pressure value $P_2$, which is a pressure in the downstream side of the fluid resistor 4, based on the measurement flow rate value $Q_T$ at a time when the state is judged to be stable, and the measurement pressure value $P_1$ measured by the pressure sensor 3 (Step S4). After the calculation pressure value $P_2$ is calculated by the pressure calculating part 6, the flow rate calculating part 7 calculates the calculation flow rate value $Q_P$, separately from the thermal type flow rate sensor 1, based on the measurement pressure value $P_1$ which is measured by the pressure sensor 3 and sequentially varying, and the calculation pressure value $P_2$ which is treated as a fixed value after it is calculated by the pressure calculating part 6 (Step S5). Herein, until the calculation pressure is calculated in the pressure calculating part 6, the flow rate calculating part 7 outputs the calculation flow rate value $Q_P$ by using a predetermined specified pressure value. Therefore, as shown in FIG. 4, in a period where the state of the fluid enters a stable state after starting the flow rate control and until the calculation pressure value $P_2$ is calculated, the fluid is in a state where there exists an offset in the measurement flow rate value $Q_T$ and calculation flow rate value $Q_P$. After the flow rate calculating part 7 begins to calculate the calculation flow rate value $Q_P$ using the calculation pressure value $P_2$, the offset with respect to the measurement flow rate value $Q_T$ becomes almost negligible. After the flow rate calculating part 7 begins to calculate the calculation flow rate value $Q_P$ using the calculation pressure, the abnormality diagnosing part 8 compares the measurement flow rate value $Q_T$ and the calculation flow rate value $Q_P$ (Step S6). In the case where an error between the measurement flow rate value $Q_T$ and the calculation flow rate value $Q_P$ becomes equal to or larger than a predetermined value (Step S7), it is judged that there occurs an abnormality equal to or larger than an acceptable value in the measurement flow rate value $Q_T$ measured by the thermal type flow rate sensor 1 and fed back to the flow rate control valve 2 (Step S8). If an occurrence of an abnormality is judged by the abnormality diagnosing part 8, for example, maintenance work such as checking the parts of the thermal type flow rate sensor 1, and checking for clogging of the device, etc. can be carried out by workers.

In order to configure a conventional pressure type flowmeter for comparison to the thermal type flow rate sensor 1, pressure sensors 3 are inherently provided both in the upstream and downstream sides of the fluid resistor 4, whereas according to the mass flow controller 100 and diagnostic device 200 of the first embodiment configured as described above, the pressure sensor 3 is attached to only one of the upstream and downstream sides so that an abnormality of the measurement flow rate value $Q_T$ can be diagnosed while reducing the number of parts, especially, the number of sensors. Moreover, as to the calculation pressure value $P_2$ which is a pressure in the downstream side of the fluid resistor 4 where a pressure sensor 3 is not provided, since it is estimated based on the measurement flow rate value $Q_T$ and measurement pressure value $P_1$ at the time of the state of the fluid flowing through the flow channel ML being in a stable state, the calculation flow rate value $Q_P$ can be calculated based on a pressure with substantially equal accuracy, despite reducing the number of sensors. That is, the calculation flow rate value $Q_P$ can be made substantially equal to an actual flow rate of the fluid flowing through the flow channel ML. Therefore, in the case of using the calculation flow rate value $Q_P$ as a comparison criterion for diagnosing an abnormality of the measurement flow rate value $Q_T$ to be measured by the thermal type flow rate sensor 1, it is possible to perform a quantitative evaluation, for example, determining to what degree an error is caused by an abnormality. For this reason, occurrence of an abnormality is found not by a rough diagnosis, but rather by a precise evaluation such that, when a disturbance occurs, it is not regarded as an abnormality if it is within an acceptable range, wherein a diagnosis can be performed in accordance with a predetermined condition.

Figure 5:
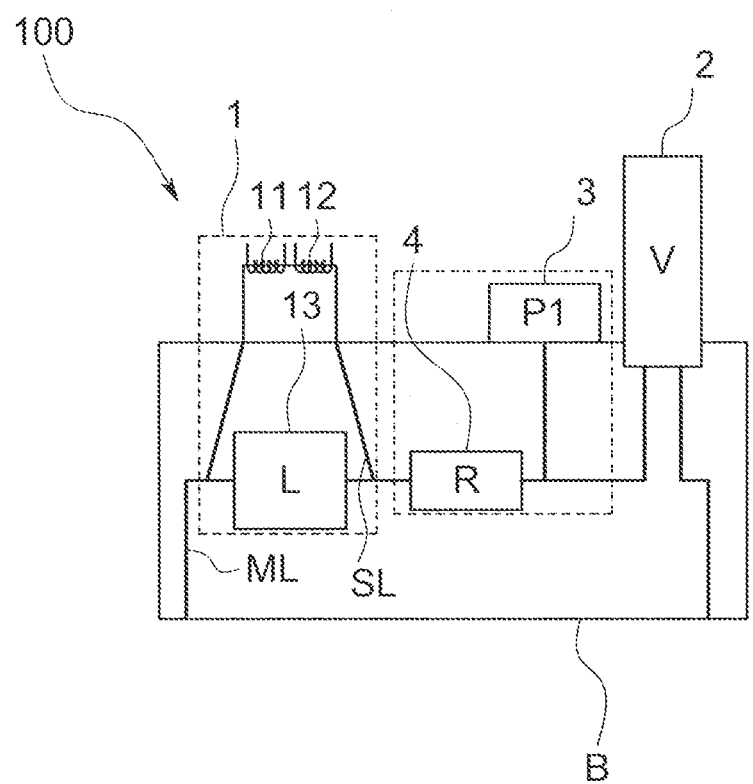
FIG. 5 is a schematic diagram showing a mass flow controller and a diagnostic device according to a second embodiment of the present invention.

Next, the second embodiment of the present invention is described referring to FIG. 5. Members and parts corresponding to those in the first embodiment are designated by the same reference numerals.

Although the pressure sensor 3 is provided only in the upstream side of the fluid resistor 4, the pressure sensor 3 may alternately be provided only in the downstream side so that an unknown pressure in the upstream side of the fluid resistor 4 may be calculated by the pressure calculating part 6. Even with this configuration, an abnormality occurring in the measurement flow rate value $Q_T$ can be quantitatively diagnosed with high accuracy similarly to the mass flow controller 100 of the first embodiment. In addition, as shown in the second embodiment, the thermal type flow rate sensor 1, fluid resistor 4, pressure sensor 3 and flow rate control valve 2 may be provided in this order from an upstream of the flow channel ML. That is, the order of the flow rate measuring mechanism, flow rate control valve 2, pressure sensor 3 and fluid resistor 4 arranged along the flow channel ML is not especially limited.

Other embodiments will be described below.

In each of the above embodiments, although the flow rate control device configured as the mass flow controller is exemplified, a similar flow rate control device may be configured without packaging each of the parts. In addition, by installing a diagnostic program for executing functions as the stable state judging part, pressure calculating part, flow rate calculating part and abnormality diagnosing part from, for example, a recording medium to a computer constituting an existing mass flow controller, a diagnosis performing configuration may be added. Moreover, the flow rate control device and diagnostic device may be configured to omit the stable state judging part so that the pressure calculating part calculates a calculation pressure value regardless of a state of the fluid and the abnormality diagnosing part performs an abnormality diagnosis. Moreover, a flow rate measuring mechanism such as a thermal type flow rate sensor or a pressure type flow rate sensor as a single body may be provided on a flow channel and it may be also possible to diagnose using the diagnostic device whether or not an abnormality occurs in a measurement flow rate value measured by the flow rate measuring mechanism.

The flow rate measurement mechanism is not limited to a thermal type flow rate sensor, or other pressure type sensor, and a sensor using another measurement principle may be used. In addition to adapting the stable state judging part to judge whether or not a fluid state is stable based on an error between a measurement flow rate value and a target flow rate value, for example, it may be also possible to configure the stable state judging part to judge whether or not a fluid state is stable based on a pressure value measured by the pressure sensor. Although the abnormality diagnosing part is configured to diagnose whether or not an abnormality occurs in the measurement flow rate value, for example, it may also be configured to diagnose a cause of an occurrence of an abnormality in the measurement flow rate value. The fluid resistor may be a laminar flow element of the thermal type flow rate sensor. For example, instead of providing the laminar flow element and the fluid resistor separately in the flow channel, these may be provided in common. In this case, it may be sufficient to provide the pressure sensor in any of the upstream side or downstream side of the laminar flow element. In addition, the calculating Expression 3 of a flow rate shown in the above embodiments is merely one example, and an alternate appropriate calculating expression may be used in accordance with, for example, a particular usage condition.

In addition, the embodiments of the present invention may be combined and various changes and modifications can be made unless departing from the intended spirit thereof.

Industrial Applicability

Thus, according to the flow rate control device, a diagnostic device for use in the flow rate measuring mechanism or for use in the flow rate control device which includes the flow rate measuring mechanism and the recording medium having a diagnostic program recorded thereon for use in the same of the present invention, as a configuration for diagnosing an abnormality, it is sufficient to provide only one sensor other than the flow rate measuring mechanism for outputting a measurement flow rate value to be used in the feedback control. Hence, the number of parts can be reduced so as to suppress the increase of the manufacturing cost.

In addition, since the calculation flow rate value can be accurately calculated by calculating the calculation pressure value and calculation flow rate value based on the measurement flow rate value and measurement pressure value at the time of fluid being in a stable state, it becomes possible to diagnose an abnormality of the measurement flow rate value with an accuracy equal to or higher than a conventional sensor configuration even in the case where the number of the diagnostic sensors is smaller than that in the conventional configuration.

The invention claimed is:

1. A flow rate control device including a flow rate measuring mechanism configured to measure a flow rate of fluid flowing through a flow channel, a flow rate control valve provided on the flow channel, and a valve control part configured to control an opening degree of the flow rate control valve so as to reduce an error between a target flow rate value and a measurement flow rate value measured by the flow rate measuring mechanism, the flow rate control device comprising:
a fluid resistor provided on the flow channel;
a pressure sensor provided in any one of an upstream side or a downstream side of the fluid resistor;
a pressure calculating part configured to calculate a pressure in a side where the pressure sensor is not provided with respect to the fluid resistor based on a measurement flow rate value measured by the flow rate measuring mechanism and a measurement pressure value measured by the pressure sensor;
a flow rate calculating part configured to calculate a flow rate of the fluid flowing through the flow channel based on the measurement pressure value and a calculation pressure value calculated by the pressure calculating part; and
an abnormality diagnosing part configured to diagnose an abnormality of the measurement flow rate value based on the measurement flow rate value and a calculation flow rate value calculated by the flow rate calculating part.

2. The flow rate control device according to claim 1 further comprising a stable state judging part configured to judge whether or not a state of the fluid flowing through the flow channel is in a stable state, based on the measurement flow rate value or a measurement pressure value measured by the pressure sensor, wherein
the pressure calculating part is configured to calculate the pressure in the side where the pressure sensor is not provided with respect to the fluid resistor when the stable state judging part judges the state of the fluid to be in a stable state.

3. The flow rate control device according to claim 1, wherein the stable state judging part is configured so as to judge that the state of the fluid is in a stable state when a state of an absolute value of the error between the measurement flow rate value and the target flow rate value being equal to or smaller than a predetermined value continues for a predetermined time period or more.

4. The flow rate control device according to claim 1, wherein the abnormality diagnosing part is configured to diagnose that there is an abnormality in the measurement flow rate value when an absolute value of an error between the measurement flow rate value and the calculation flow rate value becomes equal to or larger than a predetermined value.

5. The flow rate control device according to claim 1, wherein the flow rate calculating part is configured to calculate the calculation flow rate value based on the measurement pressure value and a predetermined specified pressure value until the stable state judging part judges the state of the fluid to be in a stable state.

6. The flow rate control device according to claim 1, wherein the flow rate measuring mechanism is a thermal type flow rate sensor.

7. The flow rate control device according to claim 6, wherein the thermal type flow rate sensor includes a laminar flow element provided on the flow channel and the fluid resistor is provided separately from the laminar flow element.

8. A diagnostic device for use in a flow rate measuring mechanism configured to measure a flow rate of fluid flowing through a flow channel or in a flow rate control device including the flow rate measuring mechanism, the diagnostic device comprising:
a fluid resistor provided on the flow channel;
a pressure sensor provided in any one of an upstream side or a downstream side of the fluid resistor;
a pressure calculating part configured to calculate a pressure in a side with respect to the fluid resistor where the pressure sensor is not provided based on a measurement flow rate value measured by the flow rate measuring mechanism and a measurement pressure value measured by the pressure sensor;
a flow rate calculating part configured to calculate a flow rate of the fluid flowing through the flow channel based on the measurement pressure value and a calculation pressure value calculated by the pressure calculating part; and
an abnormality diagnosing part configured to diagnose an abnormality of the measurement flow rate value based on the measurement flow rate value and a calculation flow rate value calculated by the flow rate calculating part.

9. A recording medium having a diagnostic program recorded thereon, the diagnostic program for use in a flow rate control device including the flow rate measuring mechanism or a flow rate measuring mechanism including a fluid resistor provided on a flow channel and a pressure sensor provided in any of an upstream side or a downstream side of the fluid resistor, and measuring a flow rate of the fluid flowing through the flow channel, the diagnostic program when executed by a CPU of a computer, causing the computer to execute the following functions:
- a pressure calculating part configured to calculate a pressure in a side with respect to the fluid resistor where the pressure sensor is not provided based on a measurement flow rate value measured by the flow rate measuring mechanism and a measurement pressure value measured by the pressure sensor;
- a flow rate calculating part configured to calculate a flow rate of the fluid flowing through the flow channel based on the measurement pressure value and a calculation pressure value calculated by the pressure calculating part; and
- an abnormality diagnosing part configured to diagnose an abnormality of the measurement flow rate value based on the measurement flow rate value and a calculation flow rate value calculated by the flow rate calculating part.

* * * * *